Figure 1:
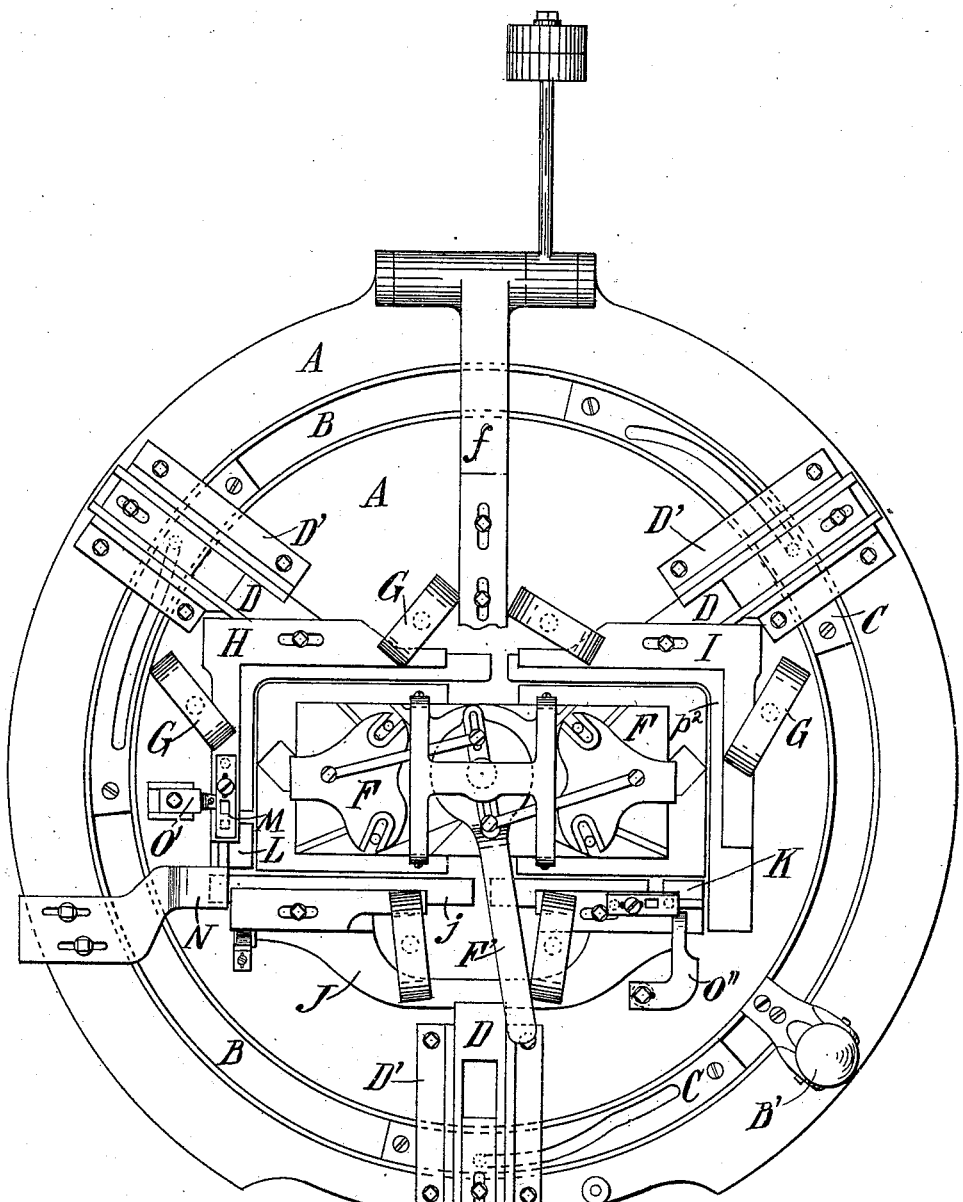

No. 841,675.

PATENTED JAN. 22, 1907.

G. J. DORMANDY.
INFOLDING MACHINE.
APPLICATION FILED NOV. 24, 1902.

9 SHEETS—SHEET 1.

No. 841,675. PATENTED JAN. 22, 1907.
G. J. DORMANDY.
INFOLDING MACHINE.
APPLICATION FILED NOV. 24, 1902.

9 SHEETS—SHEET 3.

No. 841,675. PATENTED JAN. 22, 1907.
G. J. DORMANDY.
INFOLDING MACHINE.
APPLICATION FILED NOV. 24, 1902.

9 SHEETS—SHEET 4.

WITNESSES
INVENTOR

No. 841,675. PATENTED JAN. 22, 1907.
G. J. DORMANDY.
INFOLDING MACHINE.
APPLICATION FILED NOV. 24, 1902.

9 SHEETS—SHEET 5.

WITNESSES
INVENTOR

No. 841,675. PATENTED JAN. 22, 1907.
G. J. DORMANDY.
INFOLDING MACHINE.
APPLICATION FILED NOV. 24, 1902.

9 SHEETS—SHEET 6.

No. 841,675. PATENTED JAN. 22, 1907.
G. J. DORMANDY.
INFOLDING MACHINE.
APPLICATION FILED NOV. 24, 1902.
9 SHEETS—SHEET 7.
Fig.13.
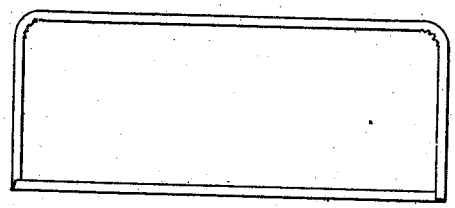
Fig.12.
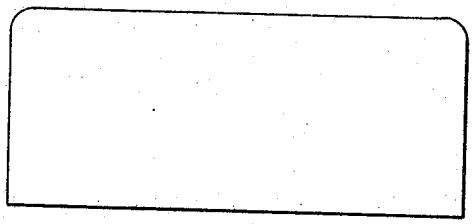
Fig.7. Fig.8.
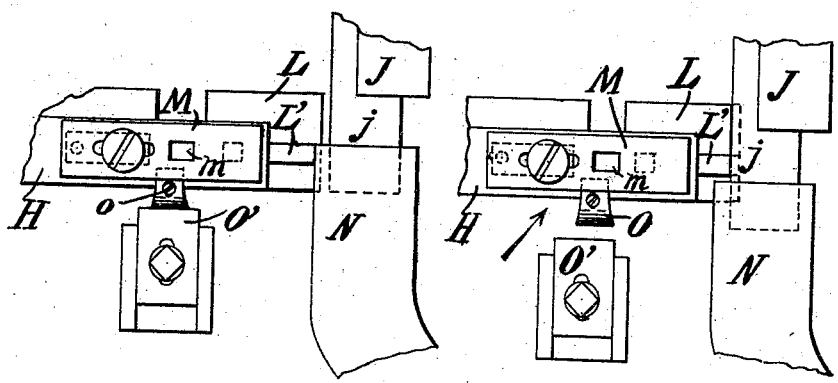
Fig.10. Fig.11.
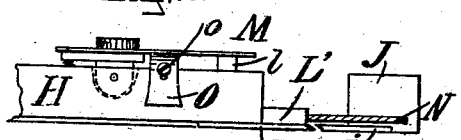
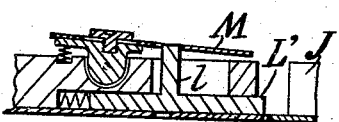
WITNESSES
William A. Sweet
Fig.9.
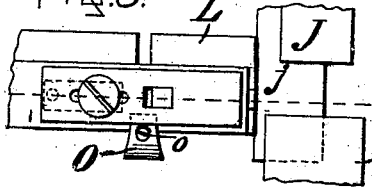
INVENTOR
Garry J. Dormandy
by
ATTORNEYS No. 841,675. PATENTED JAN. 22, 1907.
G. J. DORMANDY.
INFOLDING MACHINE.
APPLICATION FILED NOV. 24, 1902.

9 SHEETS—SHEET 8.

No. 841,675.  PATENTED JAN. 22, 1907.
G. J. DORMANDY.
INFOLDING MACHINE.
APPLICATION FILED NOV. 24, 1902.
9 SHEETS—SHEET 9.
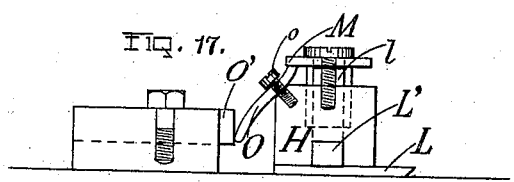

UNITED STATES PATENT OFFICE.

GARRY J. DORMANDY, OF TROY, NEW YORK, ASSIGNOR TO UNITED SHIRT AND COLLAR COMPANY, OF TROY, NEW YORK, A CORPORATION.

INFOLDING-MACHINE.

No. 841,675. Specification of Letters Patent. Patented Jan. 22, 1907.

Application filed November 24, 1902. Serial No. 132,669.

*To all whom it may concern:*

Be it known that I, GARRY J. DORMANDY, a citizen of the United States, and a resident of Troy, in the county of Rensselaer and State of New York, have invented certain new and useful Improvements in Infolding-Machines, of which the following is a specification, accompanied by drawings.

The invention relates to infolding-machines—such, for example, as are employed in infolding the edges or edge portions of blanks for cuffs, collars, and like articles.

One object of my invention is the formation of so-called "lock-corner" blanks in an improved and more efficient manner. Some of the advantages of the lock-corner blank, which has now become well known in the art, are that it obviates a bunching or irregular gathering of the fabric infolded at a corner; also, that it permits interlocking or locking of two infolded blanks when the same are fitted together preliminarily to the sewing or stitching operation, which serves to secure the two blanks together and form a complete cuff, collar, or like article.

The improvements, being related more particularly to the construction and fitting of the infolders or infolding-plates and their concomitant parts, do not concern any special type or style of infolding-machine, but may be adopted in almost any infolding-machine in which infolding-plates are employed to turn inward the edge portions of blanks having corners; but for convenience in illustrating my improvements and the object thereof I have herein shown the same as applied to a circular type of infolding-machine, which type is the same as that illustrated and described in a patent issued to me September 2, 1902, for machine for folding collar-blanks, &c., and numbered 708,030.

I will first describe a machine embodying the invention and then point out the novel features thereof in the claims.

Figure 2:
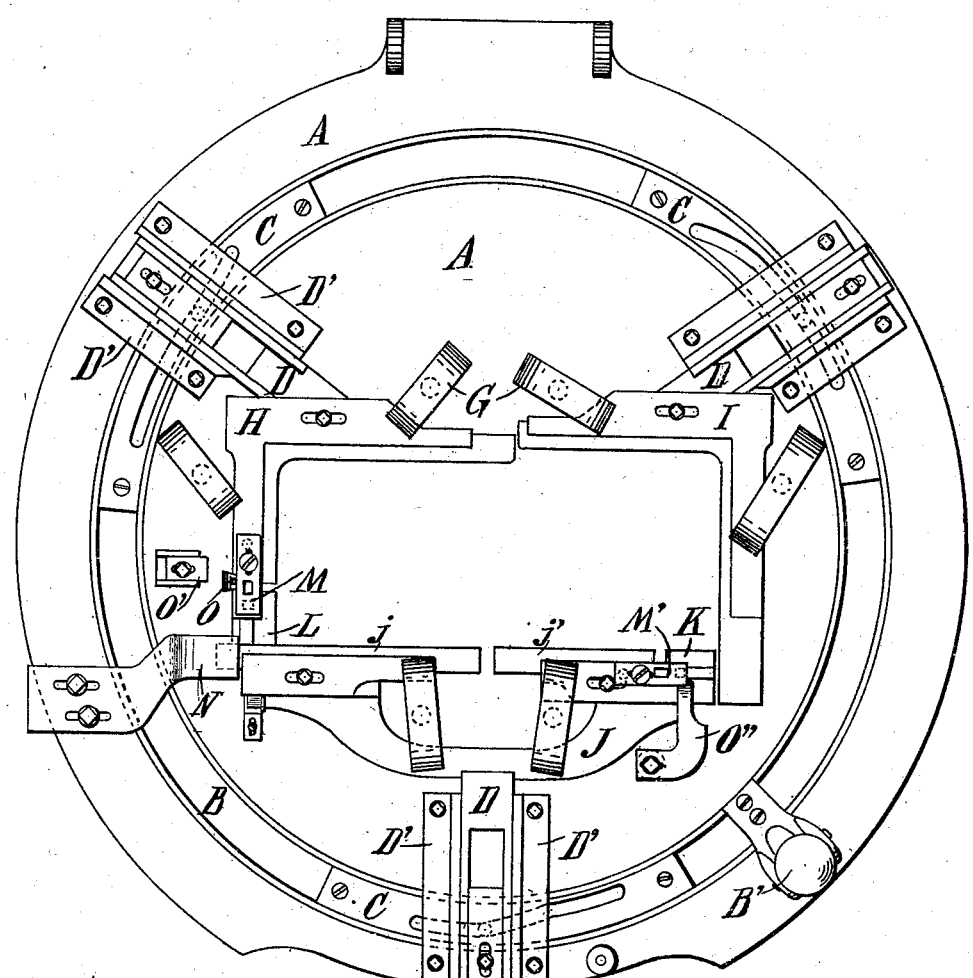
Figure 3:
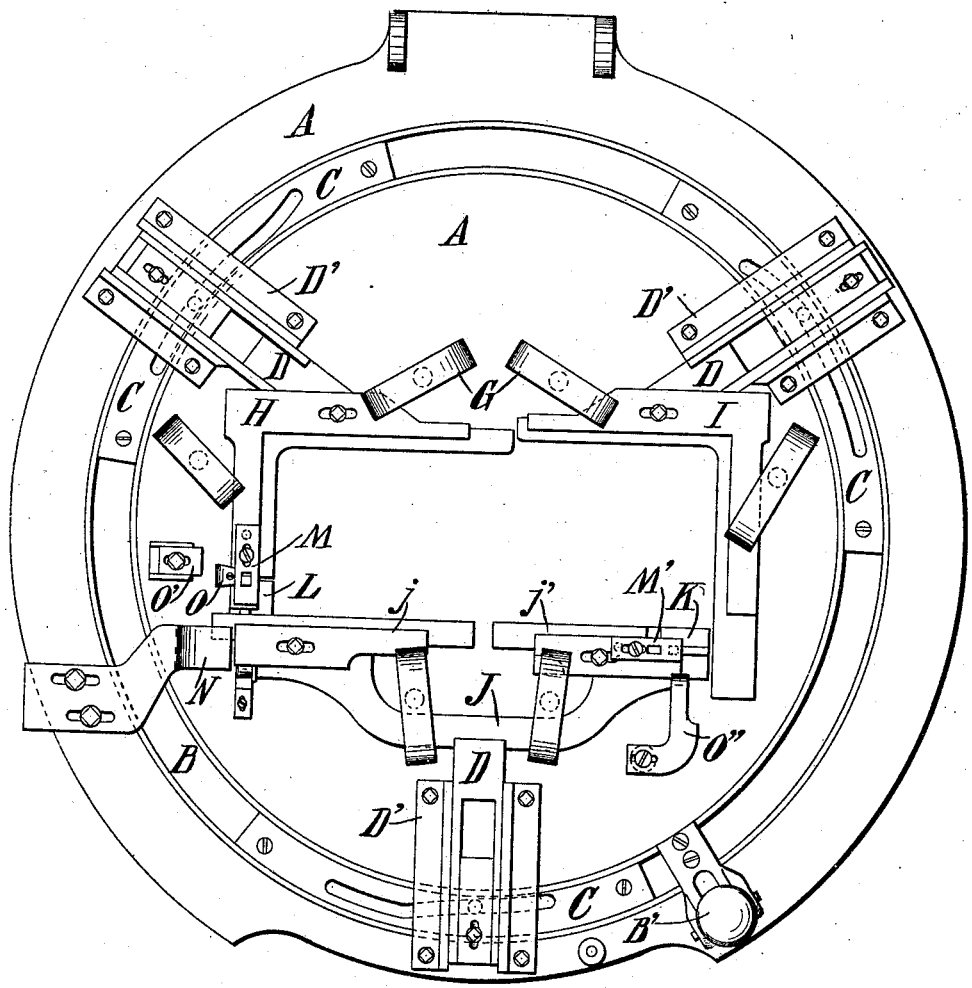
Figure 4:
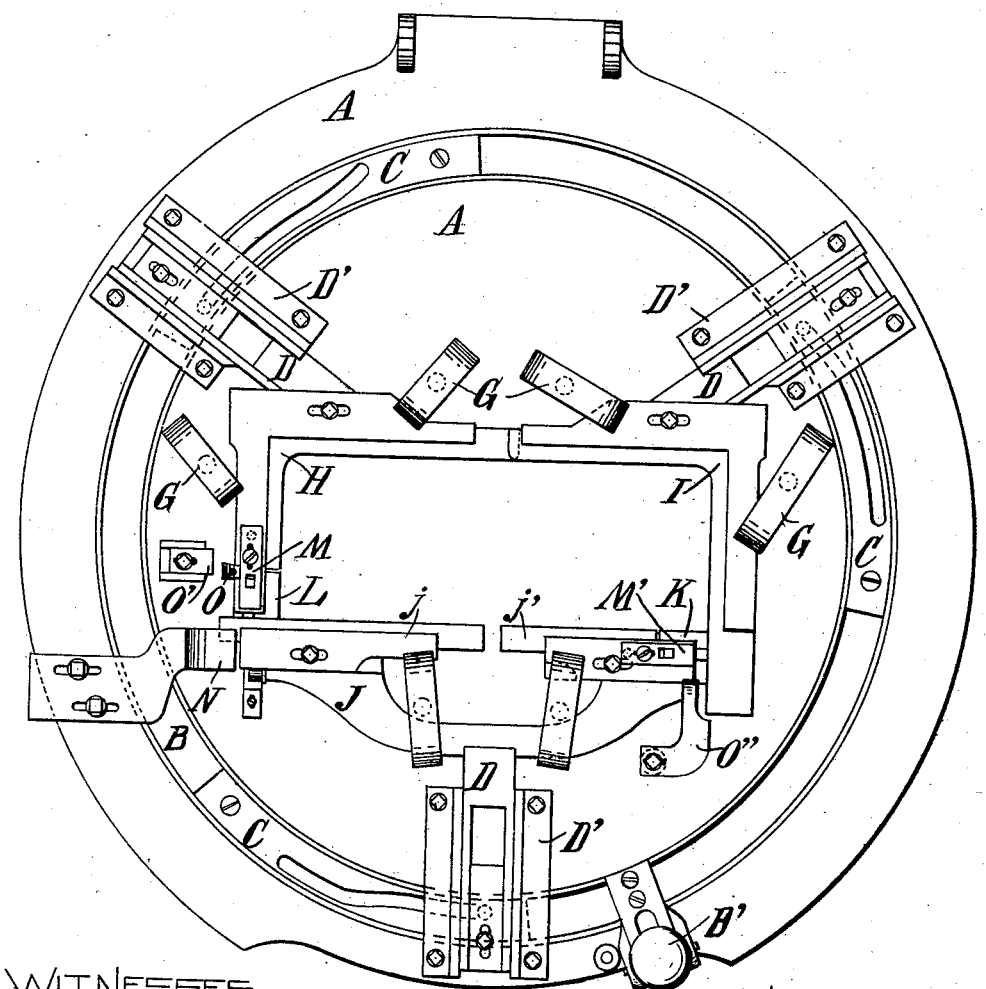
Figure 5:
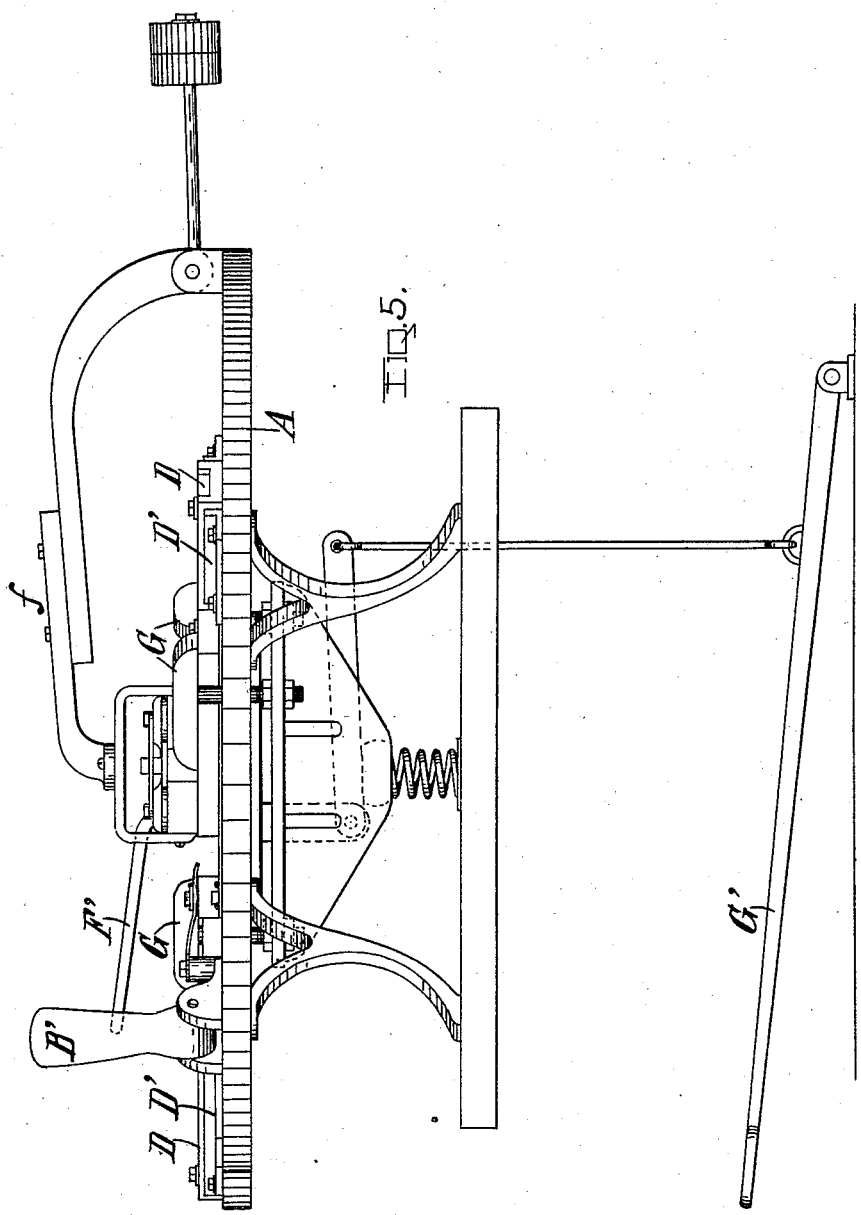
Figure 6:
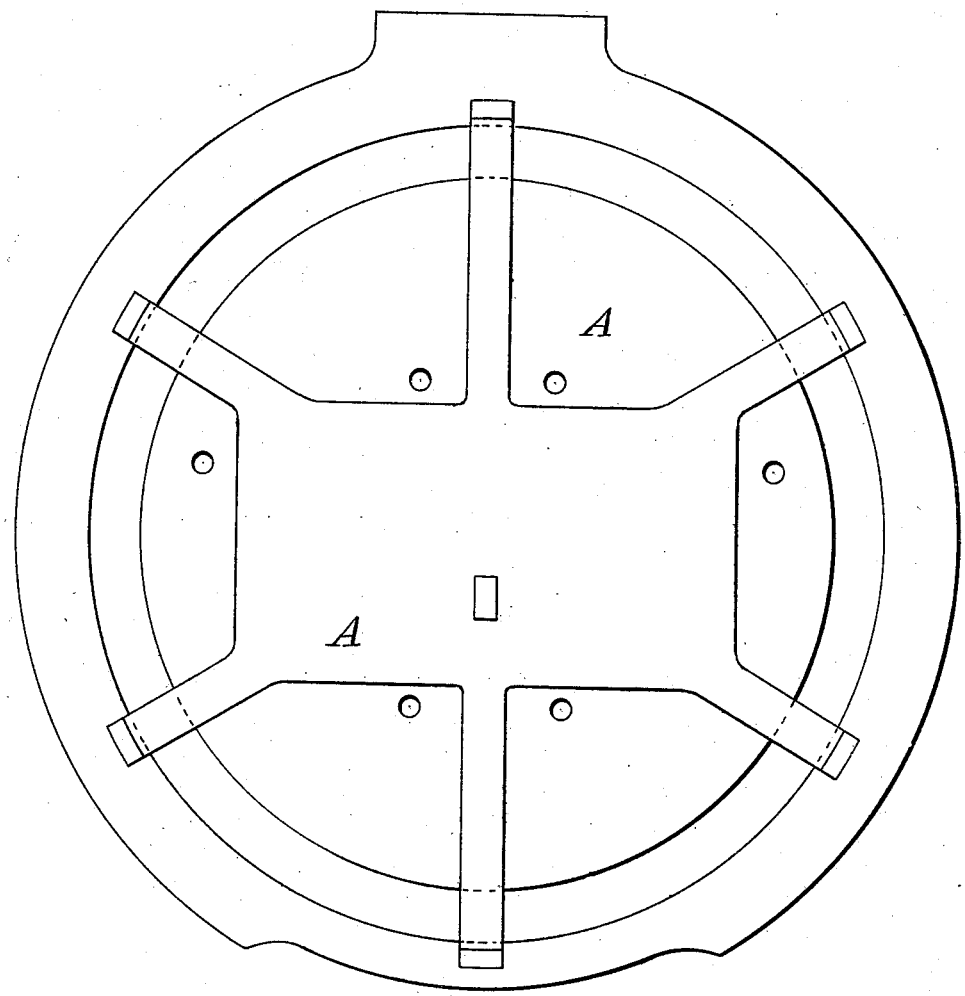
Figures 15, 16:
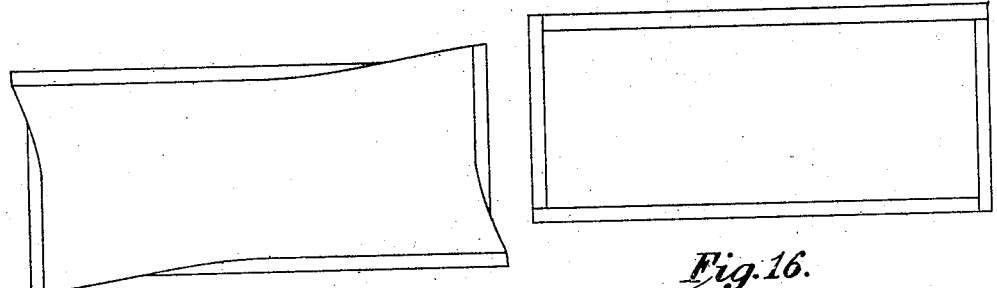
Figure 14:
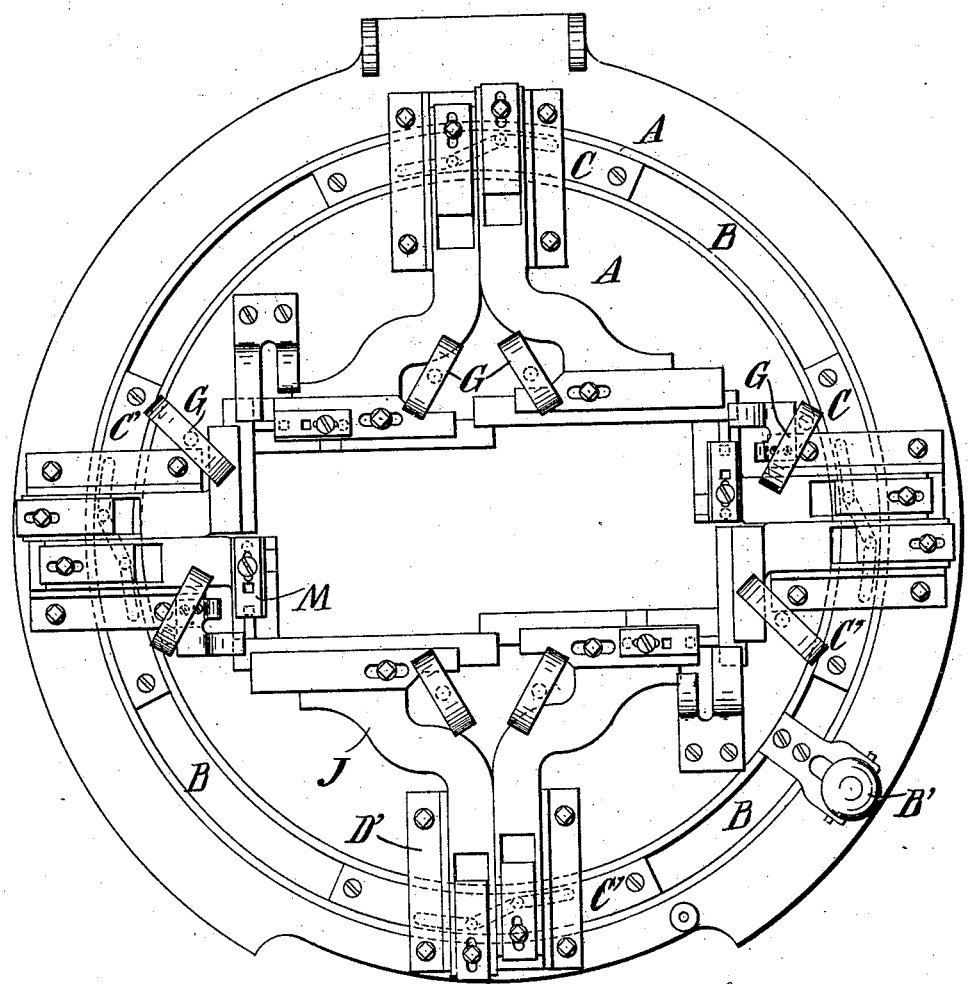

In the accompanying drawings, Figure 1 is a top view of the machine in position ready for infolding. Fig. 2 is a similar view of the machine, but with the templet and templet-carrying arm removed to show more clearly the arrangement of infolders and with certain of the infolders moved inward. Fig. 3 shows the same in a succeeding position with more of the infolders moved in. Fig. 4 shows the same when all the infolders have been moved in. Fig. 5 is a side elevation of the machine. Fig. 6 is an inverted plan view of the bed-plate or bed. Figs. 7, 8, and 9 are enlarged detail plans of certain portions of infolders and concomitant parts, the parts in the said three figures being in three different relations to each other, corresponding to Figs. 1, 2, and 3, but the views are turned ninety degrees relative to Figs. 1, 2, and 3. Fig. 10 is an elevation of the parts illustrated in Fig. 7. Fig. 11 is a section taken upon the plane 11 11 of Fig. 9. Figs. 12 and 13 illustrate, respectively, a blank before and after it has been infolded. Fig. 14 is a plan of a similar machine with infolders and mechanism adapted to fold a square lock-cornered cuff, alternate infolders moved in. Fig. 15 shows a square cuff-blank with the folding process only partially completed to correspond. Fig. 16 shows the same completely folded with all of the corners adapted to be locked. Fig. 17 shows in enlarged detail an end view of Fig. 7.

Similar letters of reference designate the same or similar parts in the several figures.

The bed or bed-plate A is provided with an annular slot for the reception of the oscillating ring B, the latter in turn being provided with an annular channel or groove adapted to receive and hold infolder-cams C. Slide-bars D fit in suitable slideways D', secured to the bed. The cam-pins projecting from adjustably-attached portions of said slide-bars D engage the cam-slots provided in the cam-plates C, as shown. The infolders H I J are secured directly to the slide-bars D and are therefore moved inward and outward by the oscillation of the ring B and cam-plates C. The handle B' is provided for oscillating the said ring. The expanding and contracting templet F is provided with a handle F', through which the expansion and contraction of the plates of the templet may be effected, and the templet-supporting arm *f* is fitted to swing about bearings connected with the bed-plate and counterbalanced in a well-known manner, and the presser-heads G, connected with and operated from a treadle G' to effect a downward movement of the infolding-plates relatively to the bed of the machine, are fully illustrated and described in my prior United States patent, No. 708,030.

In the machine of Figs. 1 to 4 two diagonally-moving corner-infolding plates H and I are shown, which serve for infolding three sides of a cuff-blank of the special form illustrated in Figs. 12 and 13, and the straight infolding-plate serves for the fourth side thereof. It will be obvious that the described arrangement of infolders is merely one of convenience and one which may be altered to any suitable extent, as may be required by the different forms of cuff or collar blanks to be infolded, the arrangements herein shown being probably the most convenient and suitable for the form of cuff having two rounded corners and two square corners, where it is not attempted to form a lock-corner at either of the rounded corners. It is for this reason that the diagonally-moving corner-plates are employed for these corners. At the two angular corners, however, where the edges of the cuff meet at an angle—in this instance a right angle—the infolders shown form double folded or interlocking corners.

In Fig. 14 are shown eight infolders and infolder mechanism adapted to fold all four corners of a rectangular lock-cornered cuff-blank, as in Figs. 15 and 16. It will be noted that I have arranged the slide-bars in pairs in each of the slideways and that in this arrangement I have four of these slideways instead of the three shown in Fig. 1. These slide-bars, while arranged in pairs in the slideways, are moved independently, and an alternate one of each pair is first moved, as shown in Fig. 14, which will produce the partially-folded blank shown in Fig. 15, and then the remaining slide-bars are moved until the blank is completely folded, as shown in Fig. 16, all being accomplished by the different timing of the cam-pins in the cam-slots, each eccentric part and the concentric part of each cam-slot being equal to the distance between each pair of cam-pins, so that one of each pair of pins will be at rest while the other set is being operated upon by an eccentric part of the cam-slot.

Heretofore a lock-corner has usually been formed upon infolding-machines by moving one infolding-plate adjacent the corner inward to fold the corresponding edge portion of the blank over the edge of a templet, and then while the first-operated infolding plate remains in its inward position the adjacent infolding-plate has been moved inward to fold the corresponding adjacent edge of the cuff-blank over the adjacent edge of the templet and also over the first-operated infolding-plate, which therefore interfere with the proper pressing of the infold to produce the sharp crease at the corner which is necessary in the production of modern high-class cuffs and collars. This is owing to the necessity of having the infolding-plates of a substantial thickness and the desirability of having the pressing operation effected directly by the infolders while in their inward position upon the infolds. On the other hand, if the infolders, or either of them, should be moved outwardly before the pressing operation, this outward movement is very liable to disturb or open the infolds, thus impairing the accuracy of the work, and the removal of the retaining action of the infolders for an appreciable length of time between the production of the infolds, and their pressing tends to endanger or prevent the production of a sharply-defined infold. Indeed, one of the chief, if not the chief, advantages of the employment of an expanding and contracting templet, which has now become so widely adopted in the art, is to permit of the withdrawal of the templet edges after the formation of the infolds and before the infolders are moved in order that the blanks may be pressed directly between the infolders in their inward position and the bed, the bed being for that purpose usually heated by steam-pipes, electricity, or other means.

The present invention contemplates the production of infolds on a blank by the employment of infolders or infolding-plates that may be so operated that a perfect lock-corner may be produced during their inward movements, and yet the same will not so occupy the infolds as to interfere with the direct application of requisite pressure to produce a sharply-defined infold. This is accomplished as follows: In Figs. 1 to 11 the infolder-stocks are marked H I J. As will be seen from the shapes of their cam-slots, the stock H moves in first, then J, then I. Infolder J is shown with two plates $j\ j'$; but this is not essential. At each of the square corners one of the adjacent infolding-plates has a movable part K or L, which is mounted in some suitable way to be readily pushed aside by the adjacent infolder, while always retaining its alinement with the other portion of the same infolder. In Figs. 7 to 11 and 17 the details of the corner-plate portion L of the infolder H are shown. The thin plate portion L is mounted beneath a slide L′, which slides in the infolder-stock H, as shown, and is spring-pressed outward at its end. Upon the stock H is pivoted a spring-clip M, as shown, provided with an aperture $m$, adapted to receive and hold the pin or projection $l$ and retain the slide L′ when the slide is thrust back. On the edge of the stock H is loosely mounted a releasing lever-plate O by means of a screw $o$. One end of this lever enters beneath the clip M, while the other is directed downward and strikes a fixed stop O′ when the infolder is moved outward, and so raises the clip M to release the pin $l$. An adjustable guide N, adapted to engage the outer end of the slide L′, may be provided for guiding the inward motion of the plate L. When the infolder H moves inward, the plate L moves in with it and insures the infolding of the blank all the way to the extreme corner of the cuff-blank or other article. When the second infolder J moves in, its edge rides up over the plate L and neatly infolds the corner of the blank upon the edge of the plate L, which therefore acts as a supplemental die or templet plate. The further inward movement of the infolder J causes it to strike the slide L' and thrust back the slide L' and plate L to the position shown in Fig. 11, thus removing the plate L from the double fold formed at the corner of the blank and preventing its interfering with the pressing operation. The form of the fold at the corner is shown at the lower left-hand corner of Fig. 13. It will be readily understood by those skilled in the art that the forward edge of the plate L should be beveled downward into a sharp edge and that the infolder-plate $j$, as is usual, should be upturned slightly or beveled at its inner edge. These minute details can be shown only in Figs. 7 to 11. The clip M holds the plate L so that in the reverse motions it cannot unfold the corner. Figs. 7 and 10 show both the infolders in their outer position. Fig. 8 shows the infolder H moved in, the arrow showing the direction of travel. Figs. 9 and 11 show both infolders in their inner positions. The mechanism for the corner-plate K is similar; but no guide N is needed, and instead of a release-lever O a fixed member O'', having an incline adapted to enter beneath the clip M' and raise it to release the corner-plate, is shown. From this description the operation of these parts will be clearly seen to be as follows: In Fig. 1 the parts are in their original position. The operator by means of the handle B' turns the ring B in the direction of the hands of a watch. The slots in the cam-plates C are of such formation as to effect an inward movement of the several infolders in successive order, the corner-infolder H receiving the first inward movement, followed by the movement of the side-infolder J, and then that of the remaining corner-infolder I. Inward movement of the infolder H carries the same from the position shown in Fig. 1 to that shown in Fig. 2 to carry the corresponding blank edge inwardly over the edge of the templet. Immediately thereafter the side-infolder J moves inward, and its infolding-plate $j$ infolds the straight edge of the cuff-blank over the templet and over the sharp edge of the corner-plate L, as already described, the plate $j$ striking and pushing back the slide L' almost immediately after it rides over the edge of the plate L, and thereby carrying back the plate L and removing it from the infolded corner. Thereafter the corner-infolder I is operated in like manner, forcing back the short plate K similarly and producing a lock-corner, thus completing the formation of infolds. The pressing mechanism should now be operated after the plates of the templet F have been contracted, if a contracting type of templet is employed. After the pressing operation the parts may be returned to their original position by the operator moving the ring B in a reverse direction to its former movement. In so doing the infolder I will first be moved outwardly; but the short plate K will be retained by its clip M'. The side-infolder J will then move outwardly, finally effecting the release of the plate K through the raising of its clip M', the plate L being held fixed, and thereafter the infolder H will be moved outward until the lever O strikes against the stationary stop O', which acts upon the said lever O to elevate the clip M, and thereby free the plate L. The templet being then elevated, the completely folded and pressed blank may be removed from the bed.

By arranging my improvements on the infolders in the manner heretofore shown and described a blank will be produced which is represented in Fig. 13, in which one lock-corner opens laterally and the other longitudinally of the cuff. This is an advantage, in that it permits any two such blanks to be interlocked and dispenses with the necessity of employing one machine for forming one part and another machine for forming the other part of a cuff or like article. In Fig. 14 I have shown mechanism for infolding a cuff having four square corners. This has already been sufficiently explained, and its operation will be clear from the statement that alternate infolders operate simultaneously, first infolding, as in Fig. 15, and then the others complete the corners, as in Fig. 16. It is also obvious that by other changes of mechanism I can fold many other shapes without departing from the spirit of my invention.

It will be seen from the foregoing description that an end edge of one of two infolders may serve for the time as a templet over which the extended part of the infold already produced by it is turned inwardly by the subsequent operation of the adjacent infolders. The end edge thereby assists in the production of the second infold, prevents opening of the extended part of the first infold, and assures that the short interior fold fits snugly against the outer fold, which is obviously desirable whether or not the blanks produced are intended to interlock. Indeed, the present invention is of great value in the infolding of corners irrespective of the interlocking feature thereof, as this style of corner may be used to advantage even upon blanks in which it would be impracticable to interlock the corners.

The end edge can be safely moved away from the second infold as soon as the latter is well turned in, and while this movement is preferably at right angles to the inward movement it may be in any desired direction except toward the original or outward portion, as such movement would, as explained, tend to reopen and disturb the first fold. While the movement of the end edge from the infold formed over it may be accomplished in any of several ways, as by swinging or by an angular movement of the infolder in some constructions, it is found that the use of the detachable or separated portion of the infolder, comprising the end edge in question, is the most convenient arrangement for the style of machine shown herein.

When the end edge is moved away from the infold formed over it, it will be understood that a sharper and therefore more accurate fold-crease is permitted. This is because with only the thickness of the sharp templet edge in the fold the complete turning in of the blank edge effects a more decided crease, and particularly because after retraction of the templet edges, when that species of templet is employed, pressure may be then applied to fix the folds with no plate or metal part remaining in the fold to interfere with the pressing.

What I claim, and desire to secure by Letters Patent, is—

1. In a folding-machine, a support for a blank to be folded, infolders for folding adjacent sides of the blank, means for moving said infolders successively inward, the infolder that has prior movement having a separately-movable fold-defining edge portion over which the infolder having later movement infolds the blank, means for moving said fold-defining edge portion out of operative position, and means for locking said edge portion in its moved position.

2. In a folding-machine, a support for a blank to be folded, infolders for folding adjacent sides of the blank, means for moving said infolders successively inward, the infolder that has prior movement having a fold-defining edge portion over which the infolder having later movement infolds the blank, means for moving said fold-defining edge portion out of operative position during the movement of the later-actuated infolder, and means for locking said edge portion in its moved position.

3. In a folding-machine, a support for a blank to be folded, infolders for folding adjacent sides of the blank, means for moving said infolders successively inward, the infolder that has prior movement having a fold-defining edge portion over which the infolder having later movement infolds the blank, means on said later-actuated infolder for moving said fold-defining edge portion out of operative position, and means for locking said edge portion in its moved position.

4. In a folding-machine, a support for a blank to be folded, infolders for folding adjacent sides of the blank, means for moving said infolders successively inward, the infolder that has prior movement being provided with a separately-movable portion having a fold-defining edge over which the infolder having later movement infolds the blank, means for moving said movable portion out of operative position, and means for locking said movable portion in its moved position.

5. In a folding-machine, a support for a blank to be folded, infolders for folding adjacent sides of the blank, means for moving said infolders successively inward, the infolder that has prior movement being provided with a separately-movable portion having a fold-defining edge over which the infolder having lateral movement infolds the blank, means on said later-actuated infolder for moving said movable portion out of operative position, and means for locking said movable portion in its moved position.

6. In a folding-machine, a support for a blank to be folded, a fold-defining templet, a plurality of infolders, means for moving said infolders successively inward, the prior actuated of said infolders having a separately-movable portion, which during the movement of said infolder coöperates therewith to fold an edge of the blank over said templet, and which has a fold-defining edge over which a portion of the adjacent edge of the blank is folded by the inward movement of the later-actuated infolder, means for moving said movable portion out of operative position, and means for locking said movable portion in its moved position.

7. In a folding-machine, a support for a blank to be folded, a fold-defining templet, a plurality of infolders, means for moving said infolders successively inward, the prior actuated of said infolders having a portion separately movable thereon transversely to the line of movement of the infolder, which portion during the movement of said infolder coöperates therewith to fold the edge of the blank over said templet, and which portion has a fold-defining edge over which a portion of the adjacent edge of the blank is folded by the inward movement of the later-actuated infolder, means for moving said movable portion out of operative position, and means for locking said movable portion in its moved position.

8. In a folding-machine, a support for a blank to be folded, a fold-defining templet, a plurality of infolders, means for moving said infolders successively inward, the prior actuated of said infolders having a separately-movable portion, means for moving said portion on said infolder after the latter has completed its infolding operation, and means for locking said movable portion in its moved position.

9. In a machine for infolding the edges of blanks for cuffs or like articles, the combination of a plurality of infolders movable inwardly and outwardly, one infolder being provided with a portion fitted to slide relatively thereto, means for operating said infolder to produce an infold, and means for thereafter moving an adjacent infolder to produce an overlapping infold, for sliding said detachable or separated portion and for locking same with reference to its main portion.

10. In a machine for infolding the edges of blanks for cuffs or like articles, the combination of a support for the blanks to be infolded, a templet having edge portions capable of being retracted from the infolds formed thereover, infolders for infolding two edge portions of the blank which meet at an angle, over the edge portions of the templet, means for actuating the said infolders in succession, the one that first produces an infold being provided with a detachable or separated infolding portion capable of sliding to permit withdrawal from the fold thereafter produced by the second infolder, means for sliding said portion whereby a sharp fold may be produced, means for locking said separated portion in its moved position, and means for pressing the infolds between the support and the infolders before the latter are moved outwardly, but after the retraction of the templet edges.

11. In a machine for infolding the edges of blanks for cuffs or like articles, the combination of a plurality of infolders and actuating mechanism therefor, one infolder comprising near its end a detachable or separated portion fitted to slide relatively to the main portion thereof from its normal position, means for effecting such sliding motion and means to catch said portion in its removed position.

12. In a machine for infolding the edges of blanks for cuffs or like articles, the combination of a plurality of infolders and actuating mechanism therefor, one infolder comprising near its end a detachable or separated portion fitted to slide relatively to the main portion thereof from its normal position, means for effecting such sliding motion, means to catch said portion in its removed position, and means for returning the same to normal position after said infolder is moved outwardly.

13. In a machine for infolding the edges of blanks for cuffs or like articles, the combination of a plurality of infolders and actuating mechanism therefor, one infolder comprising near its end a detachable or separated portion fitted to slide relatively to the main portion thereof from its normal position, means for effecting such sliding motion, means to catch said portion in its removed position, a spring for returning the same to normal position, and means for releasing the same.

14. In a machine for infolding the edges of blanks for cuffs or like articles, the combination of a plurality of infolders and actuating mechanism therefor, one infolder comprising near its end a detachable or separated portion fitted to slide relatively to the main portion thereof, means for sliding said portion from its normal position, means for locking said portion in its inward position, and means operating when the infolder is in outward position for effecting a return of said portion to normal.

15. In a machine for infolding cuff-blanks or like articles, the combination of a support for the blanks to be infolded, a templet adapted to bear directly upon the blanks upon said support, infolders fitted to move inwardly and outwardly for infolding edge portions of the blanks over edge portions of the templet, one infolder comprising a detachable or separated portion fitted to slide relatively to the main portion, means whereby such sliding is effected and the adjacent infolder operated, after an infold is produced by the first-named infolder, means to catch said detachable or separated portion in removed position, and means to bring about the return of the same to normal after the infolder is in outward position.

16. In a machine for infolding cuff-blanks or like articles, the combination of a support for the blanks to be infolded, an expanding and contracting templet adapted to bear directly upon the blanks upon said support, infolders fitted to move inwardly and outwardly for infolding edge portions of the blanks over edge portions of the templet, one infolder comprising a detachable or separated portion fitted to slide relatively to the main portion, means whereby such sliding is effected and the adjacent infolder operated, after an infold is produced by the first-named infolder, means to catch said detachable or separated portion in removed position, means to bring about the return of the same to normal after the infolder is in outward position, and means for pressing the folds of the blanks between the support and infolders after the contraction of the templet and before the infolders are moved outwardly.

17. An infolding-machine in which one of the movable infolders comprises a detachable or separated portion fitted to slide relatively to the main portion, having a spring-catch to retain the same in removed position, a spring for returning the same to normal, and a fixed part adapted to automatically effect the release of said catch when the infolder is in initial position.

18. An infolding-machine in which one of the movable infolders comprises a detachable or separated portion fitted to slide relatively to the main portion, having a spring means to retain the same in removed position, a spring for returning the same to normal, and a fixed means for releasing said spring means.

19. In combination in an infolding-machine and as a means for forming two sharp overlapping folds at the corner of the article to be folded, infolding means for infolding one of said folds in advance of the other, a second infolding means for folding the second fold across the first-named fold and in coöperation with said first-named means, means for withdrawing the coöperating edge of said first-named means from the second fold and before the outward movement of said first-named infolding means, means for locking said coöperating edge in its withdrawn position, and positively-actuated means acting through said infolding means for pressing said overlapping folds.

20. In combination in an infolding-machine and as a means for forming two sharp overlapping folds at the corner of the article to be folded, infolding means for infolding one of said folds in advance of the other, a second infolding means for folding the second fold across the first-named fold and in coöperation with said first-named means, means for withdrawing the coöperating edge of said first-named means from the second fold in a path of motion entirely within the line of said fold, means for locking said coöperating edge in its withdrawn position, and positively-actuated means acting through said infolding means for pressing said overlapping fold.

In testimony whereof I have signed this specification in the presence of two subscribing witnesses.

GARRY J. DORMANDY.

Witnesses:
  WM. S. GREER,
  JOHN J. SHEA.